Oct. 1, 1968          H. J. JAHNES          3,403,827

DISPENSING APPARATUS WITH PLURAL OSCILLATING MOVEMENTS

Filed June 20, 1967

INVENTOR
HENRY J. JAHNES
BY *Robert J. Eichelberg*
ATTORNEY

United States Patent Office 3,403,827
Patented Oct. 1, 1968

3,403,827
DISPENSING APPARATUS WITH PLURAL OSCILLATING MOVEMENTS
Henry J. Jahnes, St. Albans, W. Va., assignor to Union Carbide Corporation, a corporation of New York
Filed June 20, 1967, Ser. No. 647,424
9 Claims. (Cl. 222—362)

ABSTRACT OF THE DISCLOSURE

The disclosure describes an apparatus for unidirectionally dispensing a fluid or a solid dispersed in a fluid or a flowable solid by means of a single plunger metering valve in a ported enclosure. The plunger is provided with a chamber cut through the plunger that may be displaced in the direction of the axis of the plunger as well as rotated in a direction transverse to the axis. The enclosure openings or ports are arranged to coincide with the chamber when it is displaced in either direction so that the chamber may be filled when displaced in one direction, emptied when further displaced and purged when displaced in the other direction so that an empty and completely purged chamber may be presented to the feed port in the enclosure.

---

The present invention relates to dispensing apparatus, more particularly to dispensing apparatus for metering a flowable solid, a fluid, dispersion or suspension from a feed source into a container such as a closed system.

There has been a need in the art for apparatus suitable for transferring metered quantities of slurries or solids in fluids from a feed source into a closed system in which a reaction, blending or a change in physical or chemical state is to be effected. Apparatus employed to this end should be capable of making transfers into a system operating at non-ambient temperatures and pressures. In addition, the device should be capable of metering accurate aliquots of slurries or dispersions representative of the feed stock. These feed slurries may vary in solids composition over a wide range depending upon the application, but the aliquot transferred at any instance should be representative of the composition of the feed being metered.

It is therefore an object of the present invention to overcome the difficulties encountered in the prior art and to provide apparatus suitable to the ends described above.

The present invention relates to apparatus capable of transferring metered quantities of flowable solids, dispersions, slurries or solids in liquids as well as fluids in general from a feed source into a container especially a closed system in which a change in the physical and/or chemical state of a composition is being effected.

Figure 1:
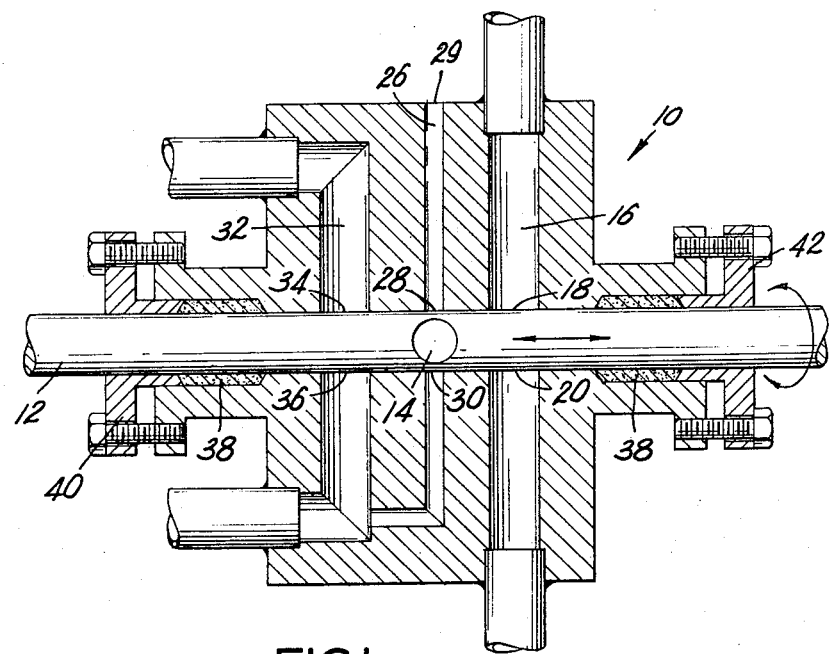
Figure 2:
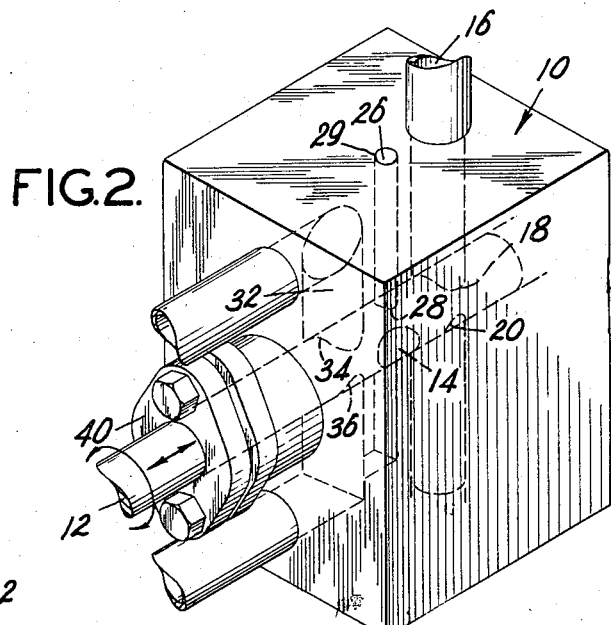
Figure 2A:
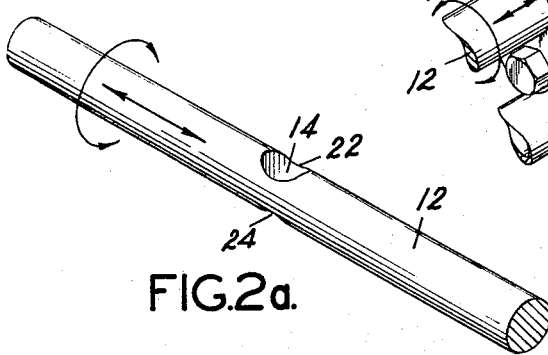

The apparatus of the present invention may be further understood by reference to:

FIGURE 1 in which one embodiment of the invention is illustrated comprising a single plunger metering valve;

FIGURE 2 being a three dimensional projection of the valve shown in FIGURE 1; and FIGURE 2a being a three dimensional view of the plunger of said valve.

Referring to FIGURE 1 an enclosure 10 is provided with a piston 12 movable within a cylindrical bore cut through enclosure 10. Piston 12 may be displaced reciprocably along the length of the cylindrical bore in opening 10 and additionally piston 12 may be rotated about its longitudinal axis so that dispensing chamber 14 may be displaced within enclosure 10 into a feeding relationship with a feeding means comprising channel 16 which intersects the cylindrical bore in enclosure 10, channel 16 having openings 18 and 20 at the two points of intersection of such cylinder. Chamber 14 cut through piston 12 also has two openings 22 and 24 comprising an inlet and an effluent port, as illustrated more particularly in FIGURE 2a. Chamber 14 may be provided with only one port means 22 or 24 in one embodiment within the broad scope of the present invention; however, the preferred apparatus has both an inlet and an effluent port in the dispensing chamber.

Enclosure 10 is also provided with vent means comprising channel 26 which intersects the cylinder in enclosure 10 at two points comprising openings 28 and 30. Optionally, channel 26 may be provided in enclosure 10 so that only one opening, opening 28, is provided as a vent port in the apparatus. Effluent means comprising channel 32 cut through enclosure 10 and intersecting the cylinder within enclosure 10 at openings 34 and 36 provides a means by which chamber 14 may be discharged of dispensible material. Again, channel 32 may be cut through enclosure 10 into the cylindrical bore so as to provide only one opening, i.e. opening 34. The opposite extremities of the cylinder are provided with packing means 38 comprising Teflon wrapping, or any other equivalent poly(fluoroethylene) packing or other packing materials well known in the art. The packing is held in place by packing retaining nuts 40 and 42 which may be adjusted to change the pressure at the interface of packing means 38 and the piston.

In a preferred embodiment of the apparatus, vent means comprising channel 26 passes through enclosure 10 and the cylindrical bore within enclosure 10 and from there into the effluent means comprising channel 32. When such an arrangement is used, a purge fluid or other material is employed to force any material from chamber 14 into channel 32 by introducing such fluid or equivalent into channel 26 at opening 29. In a preferred method of operation the apparatus of the present invention is used to effect uni-directional transfer of a fluid. The apparatus is also especially suited to effect such transfers at atmospheric, sub-atmospheric and superatmospheric pressures.

Referring to FIGURE 2, it can be seen that the longitudinal axes of channels 16, 26 and 32 are the same. The longitudinal axis of channel 26 lies in a flat plane intersecting the longitudinal axes of channels 16 and 32 and of plunger 12. In the embodiment shown in FIGURE 2, channel 26 may be placed at right angles to the vertical axes of channels 16 and 32. This latter arrangement of the axes of these various channels is preferred to simplify the operation of the dispensing apparatus of the present invention. The apparatus of the present invention is nonetheless operable should the longitudinal axes of channels 16, 26 and 32 lie in the same plane with the provision that in all cases the separation of each of these channels is at least as great as, and preferably greater than the widest opening taken along the lateral axes of the inlet and effluent ports 22 and 24 of chamber 14.

In an alternate embodiment of the apparatus, the entire assembly shown in FIGURE 1 or any equivalent thereof, obvious to one skilled in the art, may be pivotally displaced in a lateral plane into a feeding, emptying, or a venting relationship with feeding, venting or effluent means and sealing means.

In operating the apparatus illustrated in FIGURES 1, 2 and 2a, a dispensible material is introduced into channel 16 and piston 12 reciprocated and rotated until inlet ports and effluent ports 22 and 24 of channel 14 are aligned with openings 18 and 20. Complete alignment is effected when the longitudinal axes of inlet and effluent ports 22 and 24 substantially coincide with the longitudinal axes of openings 18 and 20 in channel 16. Piston 12 is then displaced through the cylindrical opening in enclosure 10 reciprocating piston 12 in the direction of effluent means comprising channel 32 dragging dispensible material in channel 14 through the cylindrical enclosure so that when inlet and effluent ports 22 and 24 are completely closed off by the inner wall of the cylindrical bore within channel 10, the dispensed material is trapped within chamber 14. Piston 12 is then rotated about its longitudinal axes so as not to present inlet and effluent ports 22 and 24 to the vent openings 18 and 20 in vent channel 26. Piston 12 is further displaced reciprocably in the direction of channel 32 and rotated after chamber 14 passes openings 28 and 30 so that the chamber 14 is in an emptying relationship with effluent means comprising channel 32. Chamber 14 is optimally aligned with effluent means comprising channel 32 when the longitudinal axes of inlet and effluent ports 22 and 24 substantially coincide with the longitudinal axes of openings 34 and 36 in channel 32. At this point the piston 12 is reciprocated in a reverse direction and is simultaneously turned on its longitudinal axes and withdrawn back through the cylindrical bore in enclosure 10. If however, a fluid or a dispersion of a solid and a fluid is passing through channel 32, some of this material will be entrained in chamber 14 when it is withdrawn from the emptying position. Accordingly, chamber 14 may be vented or purged by twisting cylinder 12 about its longitudinal axes so as to align the longitudinal axes of inlet port and effluent ports 22 and 24 to substantially coincide with the longitudinal axes of openings 28 and 30.

Purge fluid is then optionally caused to flow through opening 29 in channel 26 thereby causing any entrained material in chamber 14 to be vented or forced back into effluent means comprising channel 32. The purge fluid may comprise a gas or a liquid or a suspension or dispersion of a solid therein or any inert material that does not alter the nature of the material passing through channel 32. The piston 12 is further reciprocably displaced towards feeding means comprising channel 16 and the cycle repeated again.

The apparatus of the present invention may be used for metering fluids or suspensions or dispersions of solids in fluids across a pressure drop or a temperature differential.

In summation, the present invention in one preferred embodiment comprises a single piston metering valve for transferring aliquot portions of a material from a continuous first stream of such material passing through the valve body by reciprocating the piston to a second stream of reactants also passing through a second passage in the valve body. A hole passing through the piston at preferably a right angle to the piston axis acts as the transfer reservoir of metering chamber. Reactant collected in the metering chamber when discharging the material is removed by rotating the piston 90° on its longitudinal axes on its return stroke to intersect a purge passage. The piston is then rotated back to its original alignment when returning to the first stream.

Although the invention has been described by reference to one or more embodiments, it is not intended that the broad scope of the novel apparatus be limited thereby but that certain modifications are intended to be included within the spirit and broad scope of the following claims.

What is claimed is:

1. A dispensing apparatus comprising a displaceable metering chamber means reciprocably and rotatably mounted in an enclosure means, feeding means for introducing a dispensible material into said chamber means through said enclosure means, said chamber containing port means reciprocably displaceable into a feeding position with said feeding means, effluent means for emptying said chamber of dispensible material, said effluent means leading out of said enclosure, said port means in said chamber also being reciprocably displaceable into a discharge relation with said effluent means, vent means in said enclosure, said port means being rotatably displaceable into a discharge relationship with said vent means.

2. The apparatus of claim 1 comprising sealing means mounted intermediate said chamber means and said enclosure means to form a substantially impervious fluid seal between said port and said enclosure when said chamber is displaced between said feeding means, said vent means and said effluent means.

3. The apparatus of claim 1 wherein said port means comprises an inlet port displaceable into a feeding position with said feeding means and an effluent port displaceable into a discharge relation with said effluent means.

4. A dispensing apparatus comprising a displaceable metering chamber means reciprocably and rotatably mounted in an enclosure means, feeding means for introducing a dispensible material into said chamber means through said enclosure means, said chamber containing port means which may be displaced into a feeding position with said feeding means, effluent means for emptying said chamber of dispensible material, said effluent means leading out of said enclosure, said port means in said chamber also being displaceable into a discharge relation with said effluent means, vent means in said enclosure, said chamber also being displaceable into a venting relationship with said vent means.

5. The apparatus of claim 4 where said port means comprises an inlet port and an effluent port in said chamber means.

6. The apparatus of claim 5 wherein said dispensing apparatus comprises a cylinder and a piston reciprocably and rotatably mounted therein, said chamber means comprises an opening through said cylinder, one end of said opening comprising said inlet port and the opposite end of said opening comprising said effluent port, the longitudinal axes of each of said ports being at an angle to the plane of reciprocable displacement of said piston.

7. The apparatus of claim 6 where said feeding means comprises a feed opening in said cylinder, said effluent means comprises effluent opening in said cylinder and said vent means comprises a vent opening in said cylinder, the longitudinal axes of said feed opening, vent opening and effluent opening being different.

8. The apparatus of claim 7 where said feeding means comprises a first and a second opening in said cylinder, the longitudinal axis of said inlet port means being displaceable to substantially coincide with the longitudinal axis of said first opening, said second opening having a longitudinal axis that substantially coincides with the longitudinal axis of said effluent port when said inlet port is displaced so that its longitudinal axis substantially coincides with the longitudinal axis of said first port, vent means comprising a third opening and a fourth opening in said cylinder, the longitudinal axes of said inlet port and said effluent port being displaceable to simultaneously coincide with the longitudinal axes of said third opening and said fourth opening, said effluent means comprising a fifth opening and a sixth opening in said cylinder, the longitudinal axes of said inlet port and said effluent port being displaceable to substantially and simultaneously coincide with the longitudinal axes of said fifth opening and said sixth opening.

9. The apparatus of claim 8 where one of said vent openings comprises a conduit leading into one of said effluent openings and the other of said vent openings is connected to a purge fluid conduit means.

References Cited

UNITED STATES PATENTS 3,150,517   9/1964   Kuffer et al. _____ 73—23.1
3,195,776   7/1965   Helm et al. _____ 222—370 X STANLEY H. TOLLBERG, *Primary Examiner.*